(No Model.) 3 Sheets—Sheet 1.
M. H. LINCOLN.
COMBINED SEED PLANTER AND FERTILIZER DISTRIBUTER.
No. 277,038. Patented May 8, 1883.
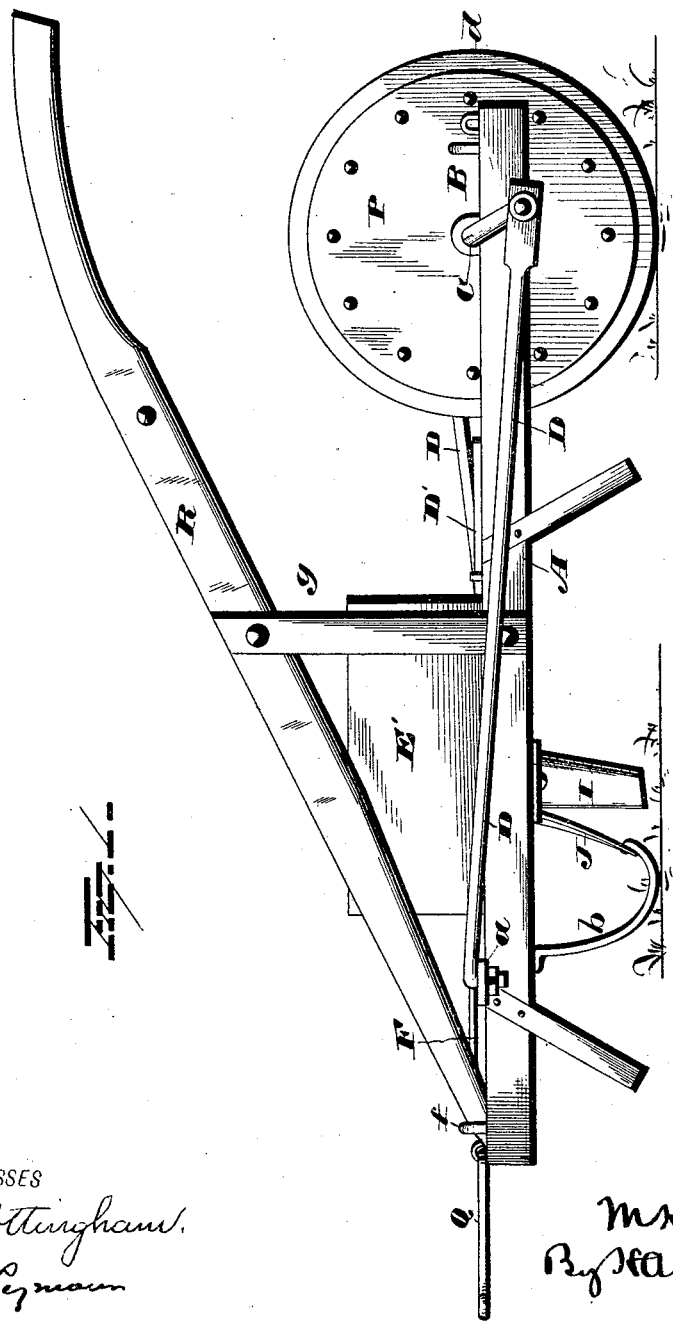

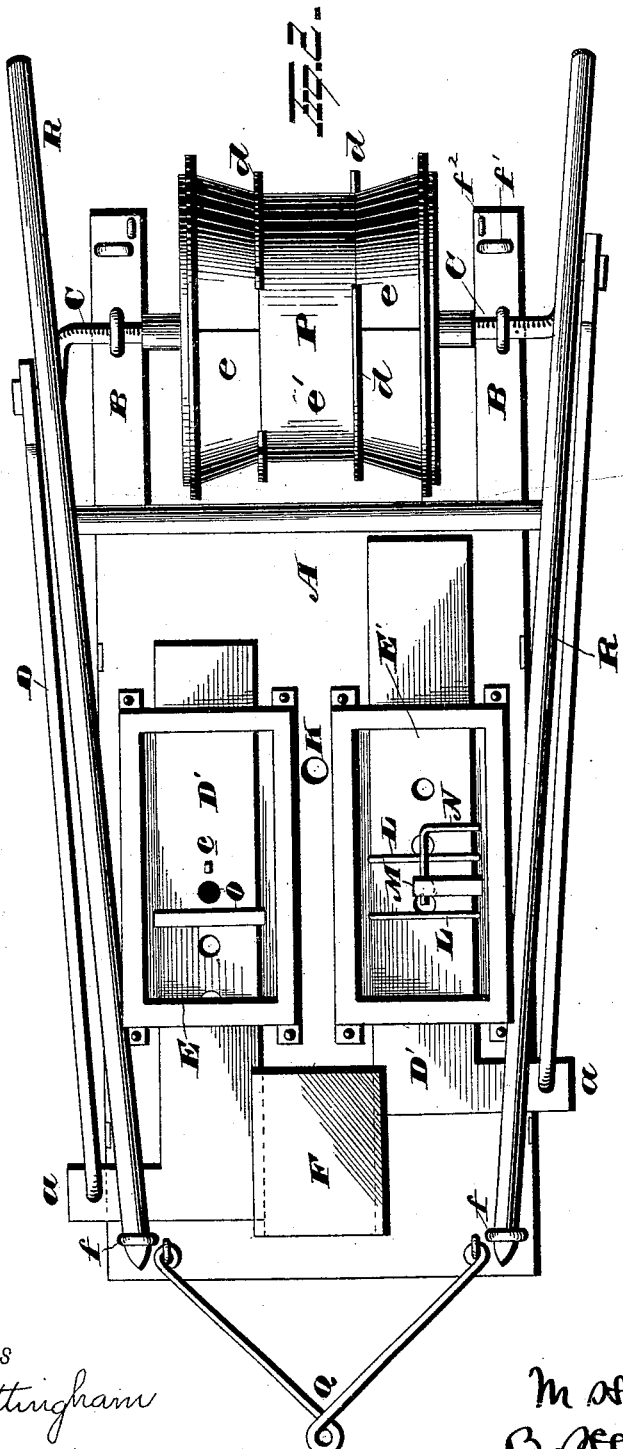

(No Model.) 3 Sheets—Sheet 3.
M. H. LINCOLN.
COMBINED SEED PLANTER AND FERTILIZER DISTRIBUTER.
No. 277,038. Patented May 8, 1883.
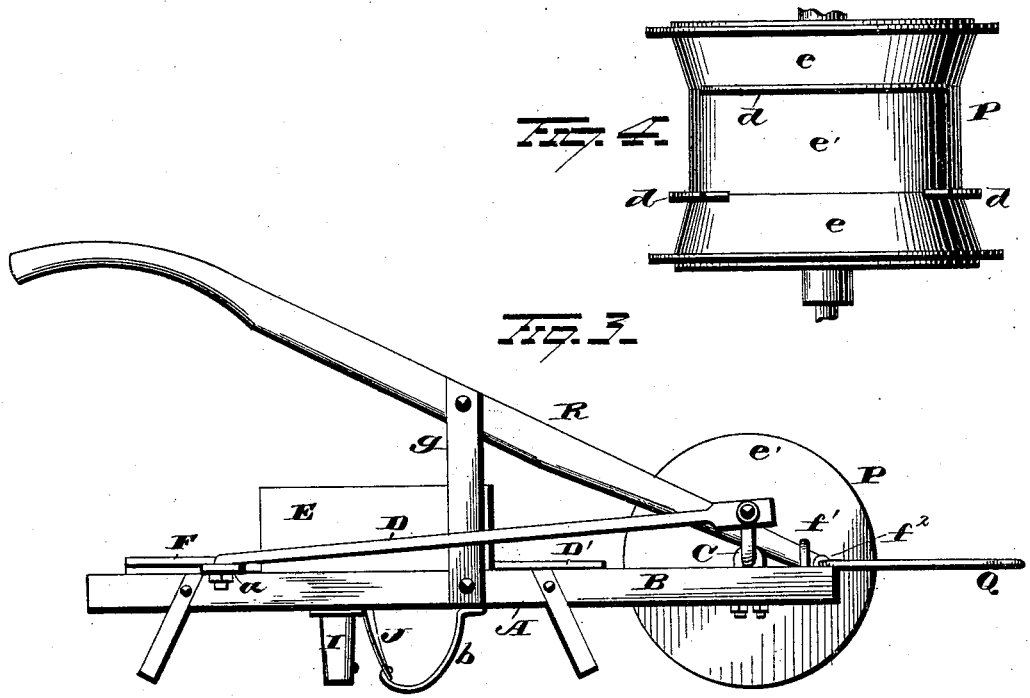
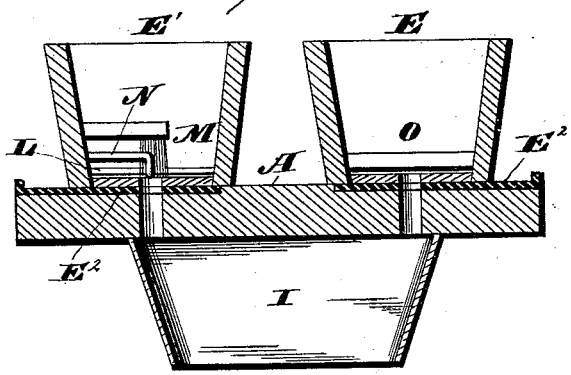
WITNESSES
INVENTOR
Attorney
N. PETERS, Photo-Lithographer, Washington, D. C.

UNITED STATES PATENT OFFICE.

MYRON H. LINCOLN, OF BEDFORD, INDIANA.

COMBINED SEED-PLANTER AND FERTILIZER-DISTRIBUTER.

SPECIFICATION forming part of Letters Patent No. 277,038, dated May 8, 1883.

Application filed November 11, 1882. (No model.)

To all whom it may concern:

Be it known that I, MYRON H. LINCOLN, of Bedford, in the county of Lawrence and State of Indiana, have invented certain new and useful Improvements in Combined Seed-Planters and Fertilizer-Distributers; and I do hereby declare the following to be a full, clear, and exact description of the invention, such as will enable others skilled in the art to which it pertains to make and use the same.

My invention relates to an improvement in combined seed-planter and fertilizer-distributers, the object of the same being to provide a device of this character which will combine simplicity and economy of construction with durability and efficiency in use; and with these ends in view my invention consists in certain details in construction and combinations of parts, as will be more fully described, and pointed out in the claims.

In the accompanying drawings, Figure 1 is a view in side elevation of my improved planter. Fig. 2 is a plan view of the same. Fig. 3 is a view of the machine when used as a walking-planter and with the clod-crushing attachment removed. Fig. 4 is a detached view of the land-roller and clod-crusher, and Fig. 5 is a transverse sectional view through the seed and fertilizer hoppers.

A represents the frame of the machine, provided with the two rearward extensions or arms, B, to which the roller-shaft C is journaled. This roller-shaft is provided with cranked ends to which the rear ends of the pitmen D are loosely secured, while the front ends of the said pitmen are loosely secured to the laterally-extending arms $a$ of the dropping-plates D' D'. These dropping-plates move respectively under the fertilizer and seed hoppers E E', and are guided at their front ends by the overlapping plate F, which holds them down in operative position. The drop-plates D' D' are alternately reciprocated backward and forward, and each is provided with any suitable number of holes adapted to register with holes in the machine-frame for the passage of the seed and fertitilizer simultaneously from their respective hoppers into the drop-throat I, where they become mixed and fall therefrom into the furrow formed by the runner $b$ and the plow J. As one drop-plate is being moved forward the other is being moved backward, and the holes therein for the passage of the grain and fertilizer are so situated that one hole in the seed drop-plate and one hole in the fertilizer drop-plate will register simultaneously with the respective openings in the machine-frame and drop the seed and fertilizer at the same time. The amount of fertilizer and seed dropped, however, at each reciprocation of the drop-plates is regulated by the slides $E^2$.

The plow J is situated in front of the drop-throat, and the lower end thereof is secured to the rear end of the curved runner $b$, while the upper end thereof is secured to the machine-frame some distance in advance of the plow J.

Between the two hoppers E E', and behind the drop-throat, is a peep-hole, K, through which the operator can see the furrow, to ascertain whether the machine is working regularly.

L are two small wires running transversely across the seed-hopper slightly above the drop-plate D, and situated respectively in front and behind the drop-hole in the machine-frame, and are adapted to cause the seed to lie evenly in the hopper when the machine is in operation.

The brush M is situated over the drop-opening in the machine-frame, and is adapted to prevent more than a given quantity of seed from dropping out of the machine at each opening of the drop-hole in the frame, while the curved spring-bar N, the free end of which rests over the drop-opening and under the brush is adapted to knock or press out any large seed that might through accident become wedged in the opening.

The above arrangement of parts insures at all times and under all conditions an even and uniform distribution of grain or seed and prevents the accidental clogging of the parts.

In the fertilizer-hopper I have secured a transverse bar, O, a slight distance above and directly over the drop-hole, under which the fertilizer passes before it issues from the machine. This bar prevents more than a given quantity from passing out at one movement of the bar, which quantity can be increased or diminished by the slide $E^2$ or by vertically adjusting the bar O. The sliding or dropping plate D' is provided with the agitators $c$, which prevent the fertilizer from settling around the sides of the hopper.

P is the combined land-roller and coverer, composed of three or more separate wheels or disks secured on the crank-shaft in the position shown, and provided with any suitable number of clod-crushers or cutters $d$, secured between and to the sides of the said wheels. When the three wheels, together with the cutters, are secured together, a complete land-roller and clod-crusher is formed, which thoroughly pulverizes the earth, and at the same time covers the furrow, which latter operation is, however, due to the concavity of the roller. The two outer wheels, $e$, are preferably made in two parts, so as to enable them to be removed from the crank-shaft without detaching the said shaft from the machine, and the parts composing a single wheel are adapted to be bolted together, and also bolted to the central wheel, $e'$, which latter is rigidly secured to crank-shaft. When the two side wheels, $e$, are removed the cutters $d$ can also be removed, or they can be secured in any suitable manner to the wheel $e'$ and crush the clods they come in contact with.

The machine can be used with the long land-roller and crusher heretofore described, or it can be employed with the single wheel $e'$ without the side wheels, $e$. In the first instance the draft-bail Q would be secured to the front end of the machine-frame, in the position shown in Fig. 1, and the handles would extend back rearwardly and terminate behind the roller.

The front ends of the handles R are removably held in staples $f$, and are supported by the two upright braces, $g$, rigidly secured to the opposite sides of the machine-frame; but when the single wheel $e'$ is only employed the position of the parts would be reversed and the rear of the machine be converted into the front and the front to the rear. In this latter instance the side wheels, $e$, are removed from the wheel $e'$, and the handles R are disengaged from the upper ends of the braces $g$, and the front ends thereof removed from the staples $f$. The handle is then turned around, and the front ends thereof are secured in the staples $f'$ alongside of the wheel, and are again secured to the upper ends of the braces $g$. The bail Q is also removed from the front of the machine, and secured to the staples $f^2$, alongside the wheel $e$. This latter construction forms an excellent walking-planter, and when so employed the plow can be transferred to the front of the drop-throat, and a suitable coverer be secured to the frame in the rear thereof.

My invention is exceedingly simple in construction, is durable and effective in use, and can be manufactured and sold at a small initial cost.

I am aware that the dropping-slides of seeders and fertilizer-distributers have been operated by crank and pitman connection with the shaft of a land-roller, and also that land-rollers have been composed of several sections, and, further, that seed-boxes have been provided with brushes and other devices for regulating the quantity of seed passing through the seed-aperture. I do not claim any of these constructions, broadly.

Having fully described my invention, what I claim as new, and desire to secure by Letters Patent, is—

1. The combination, with the machine-frame, a seed-hopper secured thereon, and a reciprocating drop-plate, of a brush situated over the discharge-opening in the frame, two transverse wires situated, respectively, in the front and rear of the said discharge-opening, all of said parts being arranged and adapted to operate essentially as set forth.

2. The combination, with the machine-frame and a seed-hopper secured thereon, and a drop-plate arranged to move under or in said hopper, of two transverse wires situated, respectively, in the front and rear of the said discharge-opening and the spring bar or knocker, the free end of which rests over the discharge-opening, substantially as set forth.

3. In a seed-dropping machine, the combination, with suitable seed-dropping mechanism, of the concaved separable land-roller made in three parts, the central part of which is rigidly secured to the roller-shaft, while the two remaining parts are removably secured to the central section, and cutters or crushers secured to the several sections, for the purpose set forth.

4. The separable land-roller made in three parts, the central one of which is cylindrical and rigidly secured to the roller-shaft, while the two end parts are flared outwardly, and removably secured to the central part or to the roller-shaft, or to both, to revolve with the central part, as described.

In testimony whereof I have signed this specification in the presence of two subscribing witnesses.

MYRON H. LINCOLN.

Witnesses:
WILLIAM M. SAINT,
JOSEPH GILES.